US011745969B2

(12) United States Patent
Suzuki et al.

(10) Patent No.: US 11,745,969 B2
(45) Date of Patent: Sep. 5, 2023

(54) SHEET SPACE-DETECTING DEVICE, SHEET SPACE-DETECTING METHOD, AND SHEET-WELDING METHOD HAVING A SPACER THAT SUPPORTS A REAR END OF A PRECEDING FIRST FIBER REINFORCED PLASTIC SHEET AND A FRONT END OF A FOLLOWING SECOND FIBER REINFORCED PLASTIC SHEET

(71) Applicant: IHI Corporation, Tokyo (JP)

(72) Inventors: Shotaro Suzuki, Tokyo (JP); Kensuke Hirata, Tokyo (JP); Yoshiyuki Wada, Tokyo (JP); Hironori Yui, Tokyo (JP); Itaru Dairaku, Tokyo (JP)

(73) Assignee: IHI CORPORATION, Tokyo (JP)

( * ) Notice: Subject to any disclaimer, the term of this patent is extended or adjusted under 35 U.S.C. 154(b) by 718 days.

(21) Appl. No.: 16/769,460

(22) PCT Filed: Dec. 5, 2018

(86) PCT No.: PCT/JP2018/044704
§ 371 (c)(1),
(2) Date: Jun. 3, 2020

(87) PCT Pub. No.: WO2019/111942
PCT Pub. Date: Jun. 13, 2019

(65) Prior Publication Data
US 2021/0188580 A1 Jun. 24, 2021

(30) Foreign Application Priority Data
Dec. 5, 2017 (JP) ................................. 2017-233606

(51) Int. Cl.
| | | |
|---|---|---|
| *G01B 11/14* | (2006.01) | |
| *B65H 7/14* | (2006.01) | |
| *B29C 65/02* | (2006.01) | |
| *B29C 65/78* | (2006.01) | |
| *B29C 65/00* | (2006.01) | |

(52) U.S. Cl.
CPC ............... *B65H 7/14* (2013.01); *B29C 65/02* (2013.01); *B29C 65/782* (2013.01); *B29C 66/41* (2013.01); *G01B 11/14* (2013.01)

(58) Field of Classification Search
CPC ......... B65H 7/14; B29C 65/02; B29C 65/782; B29C 66/41; B29C 65/18; B29C 65/222;
(Continued)

(56) References Cited

U.S. PATENT DOCUMENTS

| | | | |
|---|---|---|---|
| 7,561,259 B2* | 7/2009 | Fujii | .................. G01N 21/8901 156/64 |
| 2005/0150593 A1 | 7/2005 | Honma et al. | |
| 2015/0348255 A1 | 12/2015 | Sasamoto et al. | |
| 2017/0031233 A1 | 2/2017 | Okita | |
| 2018/0222128 A1 | 8/2018 | Tomioka et al. | |

FOREIGN PATENT DOCUMENTS

| | | |
|---|---|---|
| CN | 100344443 C | 10/2007 |
| CN | 106133595 A | 11/2016 |

(Continued)

*Primary Examiner* — Que Tan Le
*Assistant Examiner* — Mai Thi Ngoc Tran
(74) *Attorney, Agent, or Firm* — Volpe Koenig (57) ABSTRACT

A sheet space-detecting device detects a space between a rear end of a preceding first fiber reinforced plastic sheet and a front end of a following second fiber reinforced plastic sheet in a conveyance path for fiber reinforced plastic sheets and includes: a light-detecting sensor that projects detection light on an area including the rear end of the first fiber reinforced plastic sheet, the front end of the second fiber reinforced plastic sheet, and a reference surface exposed from the space and receives reflected light thereof; and a spacer that supports the rear end of the first fiber reinforced plastic sheet and the front end of the second fiber reinforced plastic sheet in a state where the rear end and the front end are separated from the reference surface, in an area including at least a light-projected area on which the detection light is projected.

9 Claims, 10 Drawing Sheets

(58) Field of Classification Search
CPC ............ B29C 66/73921; B29C 66/836; B29C 66/8362; B29C 2793/0072; B29C 2793/0081; B29C 65/08; B29C 65/7855; B29C 65/7873; B29C 66/1122; B29C 66/7212; B29C 66/72141; B29C 66/8322; B29C 66/8432; B29C 66/95; B29C 70/202; B29C 70/38; B29C 70/50; B29C 70/54; B29C 70/545; G01B 11/14; G01B 11/0608
USPC ........................................................ 250/221
See application file for complete search history.

(56) References Cited

FOREIGN PATENT DOCUMENTS

| | | |
|---|---|---|
| CN | 105899342 B | 8/2017 |
| EP | 1947417 A1 | 7/2008 |
| EP | 3093130 A1 | 11/2016 |
| JP | 59-053572 A | 3/1984 |
| JP | 60-161854 A | 8/1985 |
| JP | 60-210429 A | 10/1985 |
| JP | 02-130106 A | 5/1990 |
| JP | 2876244 B2 | 3/1999 |
| JP | 2010-132409 A | 6/2010 |
| JP | 2014-126378 A | 7/2014 |
| TW | I588510 B | 6/2017 |
| WO | 2007/052360 A1 | 5/2007 |
| WO | 2015/152325 A1 | 10/2015 |
| WO | 2017/022835 A1 | 2/2017 |

* cited by examiner

SHEET SPACE-DETECTING DEVICE, SHEET SPACE-DETECTING METHOD, AND SHEET-WELDING METHOD HAVING A SPACER THAT SUPPORTS A REAR END OF A PRECEDING FIRST FIBER REINFORCED PLASTIC SHEET AND A FRONT END OF A FOLLOWING SECOND FIBER REINFORCED PLASTIC SHEET

CROSS REFERENCE TO RELATED APPLICATIONS

This application is a national stage entry according to 35 U.S.C. 371 of PCT Application No. PCT/JP2018/044704, filed on Dec. 5, 2018, which claims priority to Japanese Application No. 2017-233606, filed on Dec. 5, 2017, which is entirely incorporated herein by reference.

TECHNICAL FIELD

The present disclosure relates to a sheet space-detecting device, a sheet space-detecting method and a sheet-welding method.

BACKGROUND

A fiber reinforced plastic sheet (FRP sheet), which uses carbon fiber or glass fiber as reinforcing fiber, is lightweight and has high durability, and thus is used for various structural members configuring automobiles, aircrafts and the like. Such an FRP sheet has very high tensile strength and toughness in the fiber direction thereof, but has low tensile strength and toughness in a direction orthogonal to the fiber direction. In order to reduce the anisotropy of the FRP sheet, method and apparatus for laminating a plurality of FRP sheets in a state of varying the fiber directions thereof from each other are conventionally known (for example, refer to Patent Document 1).

DOCUMENT OF RELATED ART

Patent Document

[Patent Document 1] PCT International Publication No. WO 2015/152325 A1

SUMMARY

Technical Problem

In the above conventional technology, in order to laminate FRP sheets having different fiber directions, FRP sheets having various fiber directions are cut from an FRP raw sheet having a fiber angle of 0°, and the cut FRP sheets are joined together by welding in the front-rear direction. At this time, in order that the rear end of an FRP sheet on the front side does not overlap the front end of an FRP sheet on the rear side, an optical space-detecting sensor is arranged to manage the size of space between the rear end and the front end of the FRP sheets. However, the front end and the rear end of the FRP sheets may hang down or fibers of which may fluff, which may cause variations in the detection accuracy of the space.

The present disclosure is made in view of the above problems, and an object thereof is to improve the detection accuracy of the space between the front end and the rear end of the FRP sheets.

Solution to Problem

In order to solve the above problems, a sheet space-detecting device of a first aspect of the present disclosure is a sheet space-detecting device that detects a space between a rear end of a preceding first fiber reinforced plastic sheet and a front end of a following second fiber reinforced plastic sheet in a conveyance path for fiber reinforced plastic sheets and includes: a light-detecting sensor that projects detection light on an area including the rear end of the first fiber reinforced plastic sheet, the front end of the second fiber reinforced plastic sheet, and a reference surface exposed from the space and receives reflected light thereof; and a spacer that supports the rear end of the first fiber reinforced plastic sheet and the front end of the second fiber reinforced plastic sheet in a state where the rear end and the front end are separated from the reference surface, in an area including at least a light-projected area on which the detection light is projected.

In the sheet space-detecting device of the first aspect of the present disclosure, the spacer may include a first support area that supports the first fiber reinforced plastic sheet, a second support area that supports the second fiber reinforced plastic sheet, and a step area provided between the first support area and the second support area.

In the sheet space-detecting device of the first aspect of the present disclosure, the step area may not extend to an edge of the spacer.

In the sheet space-detecting device of the first aspect of the present disclosure, the step area may be a groove having a bottom portion, and a direct reflection-limiting member forming the reference surface may be disposed on the bottom portion.

The sheet space-detecting device of the first aspect of the present disclosure may include a moving device that retracts the spacer from the light-projected area, and a rear end portion of the spacer may be formed to more swell up than a front end portion of the spacer.

A sheet space-detecting method of a second aspect of the present disclosure is a sheet space-detecting method of detecting a space between a rear end of a preceding first fiber reinforced plastic sheet and a front end of a following second fiber reinforced plastic sheet in a conveyance path for fiber reinforced plastic sheets, which includes: a spacer-disposing step of disposing a spacer such that the rear end of the first fiber reinforced plastic sheet and the front end of the second fiber reinforced plastic sheet are separated from a reference surface; and a light-detecting step of, after the spacer-disposing step, projecting detection light on an area including the rear end of the first fiber reinforced plastic sheet, the front end of the second fiber reinforced plastic sheet, and the reference surface exposed from the space and receiving reflected light thereof.

In the sheet space-detecting method of the second aspect of the present disclosure, an orientation direction of reinforcing fiber of the first fiber reinforced plastic sheet and the second fiber reinforced plastic sheet may be parallel to the space.

In the sheet space-detecting method of the second aspect of the present disclosure, the spacer may include a first support area that supports the first fiber reinforced plastic sheet, a second support area that supports the second fiber reinforced plastic sheet, and a step area provided between the first support area and the second support area, and the spacer-disposing step may include a first step of supporting the first fiber reinforced plastic sheet by the first support area, and disposing the rear end of the first fiber reinforced plastic sheet above the step area, and a second step of supporting the second fiber reinforced plastic sheet by the second support area, and disposing the front end of the second fiber reinforced plastic sheet above the step area such that the front end is separated from the rear end of the first fiber reinforced plastic sheet.

A sheet-welding method of a third aspect of the present disclosure is a sheet-welding method of detecting, based on the sheet space-detecting method of the second aspect, the space, and welding the rear end of the first fiber reinforced plastic sheet and the front end of the second fiber reinforced plastic sheet, which includes: a sheet position-correcting step of, after the light-detecting step, correcting a position of the second fiber reinforced plastic sheet with respect to the first fiber reinforced plastic sheet; a sheet-positioning step of, after the sheet position-correcting step, holding down a rear end portion other than the rear end of the first fiber reinforced plastic sheet, and holding down a front end portion other than the front end of the second fiber reinforced plastic sheet; and a sheet-welding step of, after the sheet-positioning step, welding the rear end of the first fiber reinforced plastic sheet and the front end of the second fiber reinforced plastic sheet.

Effects

According to the present disclosure, the detection accuracy of the space between the front end and the rear end of FRP sheets.

DESCRIPTION OF EMBODIMENTS

Hereinafter, a sheet space-detecting device, a sheet space-detecting method and a sheet-welding method will be described with reference to the drawings. In the following description, a "fiber reinforced plastic sheet" is simply referred to as an "FRP sheet".

Figure 1:
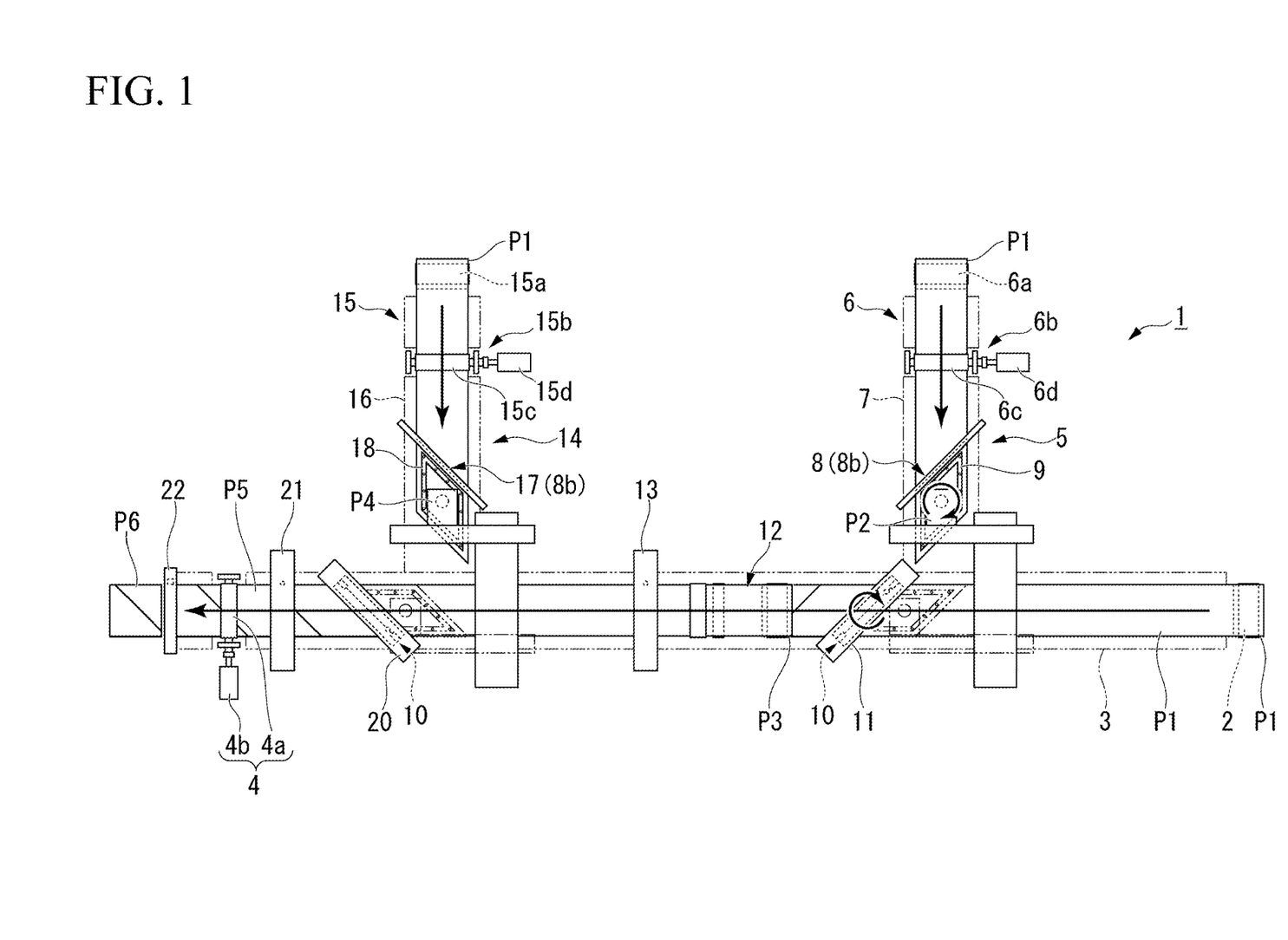
FIG. 1 is a plan view schematically showing an FRP sheet-laminating device of the present disclosure.
Figure 2:
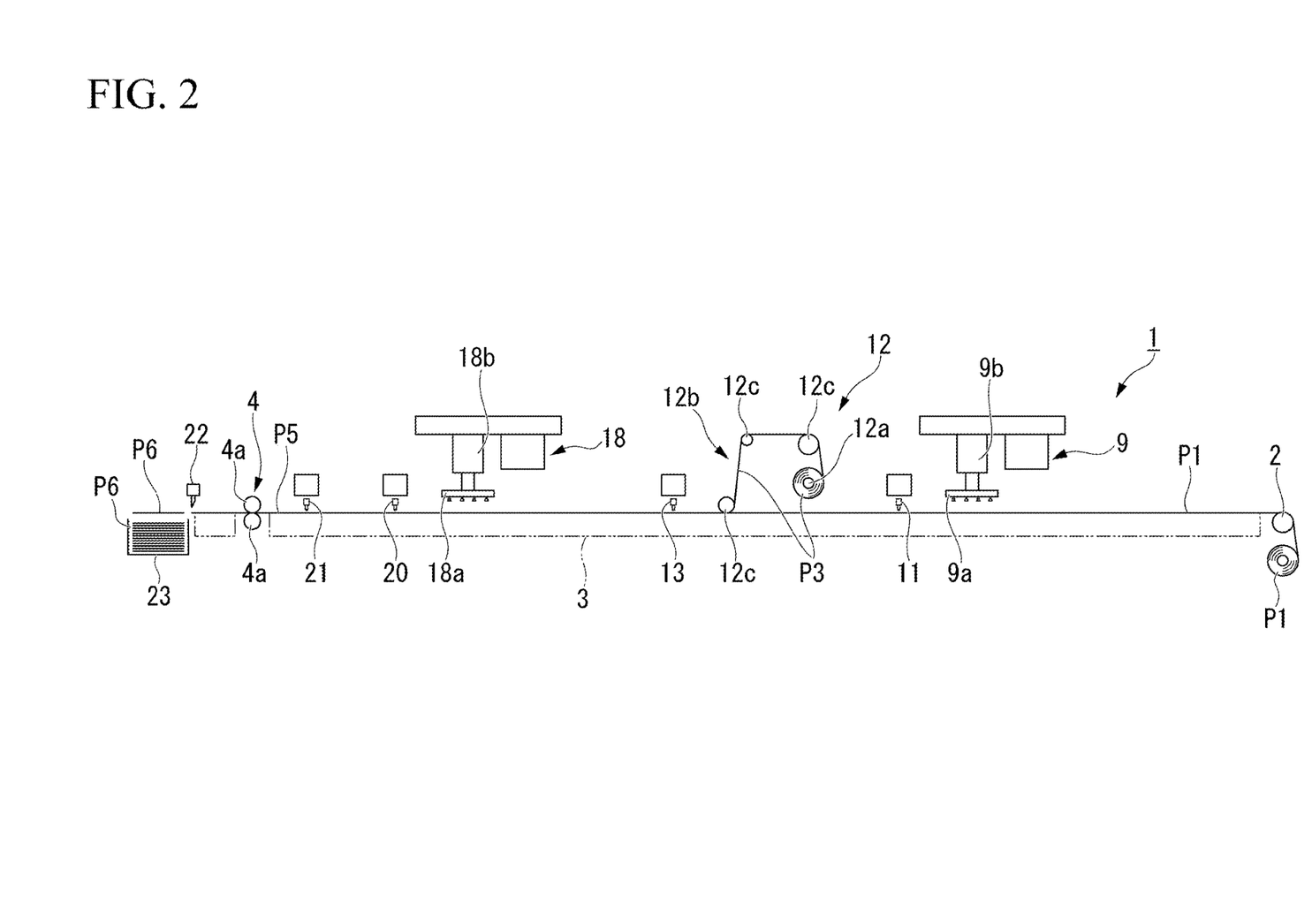
FIG. 2 is a side view schematically showing the FRP sheet-laminating device of the present disclosure.

FIG. 1 is a plan view schematically showing an FRP sheet-laminating device 1 of the present disclosure. FIG. 2 is a side view schematically showing the FRP sheet-laminating device 1 of the present disclosure.

The FRP sheet-laminating device 1 is a conveyance system that laminates a plurality of FRP sheets while conveying the FRP sheets. The FRP sheet-laminating device 1 includes an unrolling device 2 that unrolls an FRP raw sheet P1 from a state wound in a roll, a main conveyance path 3 that causes the FRP raw sheet P1 unrolled from the unrolling device 2 to travels, and a transfer device 4 that draws an FRP sheet laminate P5 having traveled on the main conveyance path 3 and sends it further downstream.

Note that a downstream side of the main conveyance path 3 in the conveyance direction of the FRP raw sheet P1 may be referred to as a front side and an upstream side thereof may be referred to as a rear side.

Figure 3:
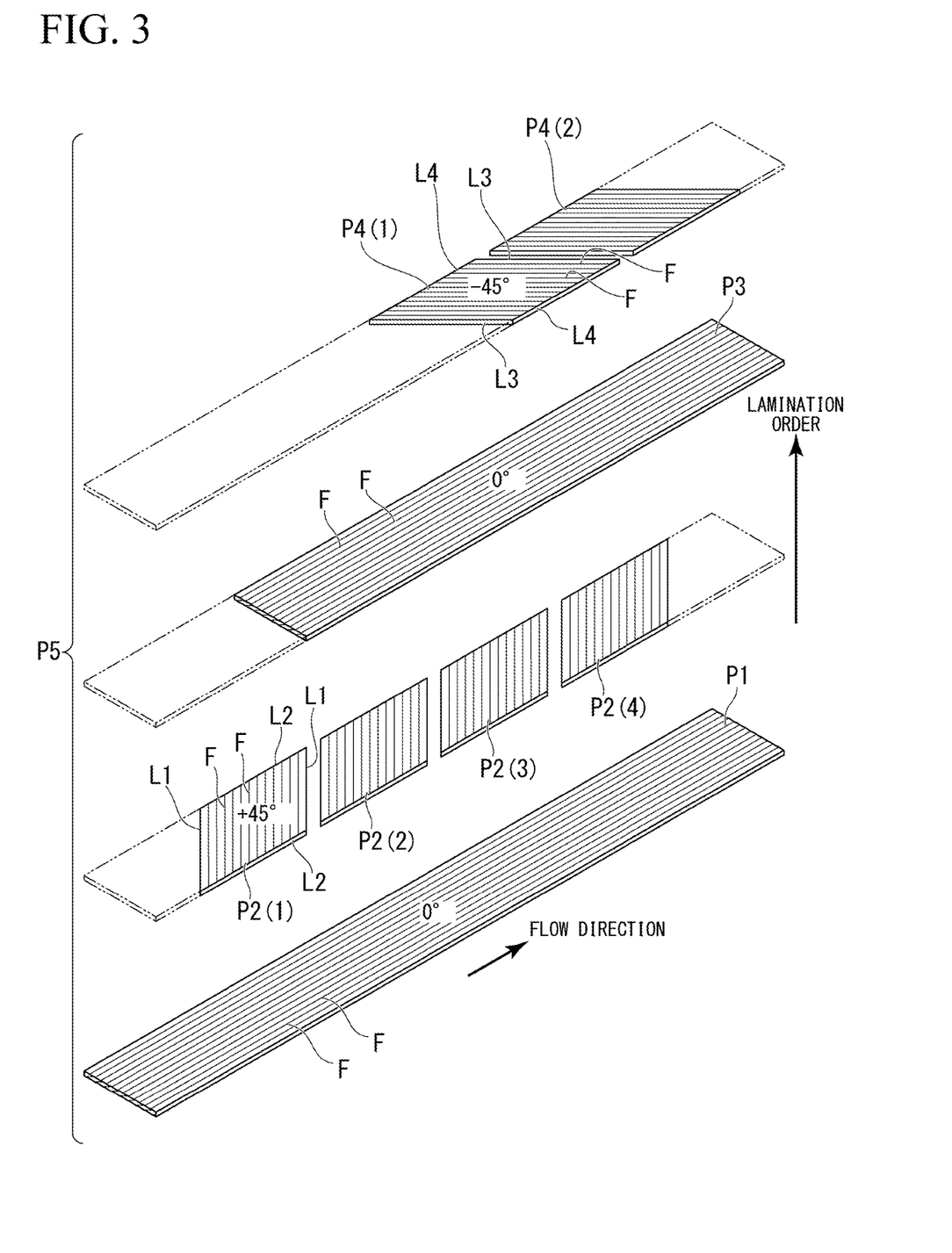
FIG. 3 is an exploded perspective view schematically showing an FRP sheet laminate formed by the FRP sheet-laminating device of the present disclosure.

FIG. 3 is an exploded perspective view schematically showing the FRP sheet laminate P5 formed by the FRP sheet-laminating device 1 of the present disclosure.

As shown in FIG. 3, the FRP sheet laminate P5 has a structure in which an FRP sheet P2, an FRP raw sheet P3 and an FRP sheet P4 are sequentially laminated on the FRP raw sheet P1.

Note that in a direction perpendicular to the plate surface of the FRP raw sheet P1 or the FRP sheet laminate P5, a side on which the FRP sheet P4 is provided may be referred to as an upper side, and a side on which the FRP raw sheet P1 is provided may be referred to as a lower side.

The FRP raw sheet P1 is formed of reinforcing fibers such as carbon fibers or glass fibers impregnated with, for example, a thermoplastic resin to have a thickness of about 50 to 300 μm. In the FRP raw sheet P1, the reinforcing fibers F (the longitudinal directions of the reinforcing fibers F) are made to be in a direction. The FRP raw sheet P1 is formed such that the orientation directions of the reinforcing fibers F (the length directions of the reinforcing fibers F) substantially match the length direction of the FRP raw sheet P1. The orientation direction of the reinforcing fiber F is referred to as 0°.

As shown in FIG. 1, the FRP sheet-laminating device 1 includes a first FRP sheet-forming section 5 that forms the FRP sheet P2, and a second FRP sheet-forming section 14 that forms the FRP sheet P4. In addition, the FRP sheet-laminating device 1 includes a welding device 11 that welds the FRP sheets P2 together arranged in front and rear, and a welding device 20 that welds the FRP sheets P4 together arranged in front and rear. The welding devices 11 and 20 are provided with sheet space-detecting devices 10 and 19 to be described later.

As shown in FIG. 2, the unrolling device 2 includes a roller and is configured to unroll the FRP raw sheet P1 in the length direction thereof from a state wound in a roll and to send it onto the main conveyance path 3. As shown in FIG. 1, the main conveyance path 3 is a support table provided in a linear shape (straight plate shape) having a width greater than that of the FRP raw sheet P1. The upper surface (supporting surface) of the main conveyance path 3 is formed into a smooth surface with a low frictional resistance such that the FRP raw sheet P1 can smoothly travel.

The transfer device 4 includes a pair of rollers 4a arranged in upper and lower as shown in FIG. 2, and a drive source 4b such as a motor connected to either one of the pair of rollers 4a as shown in FIG. 1. The transfer device 4 holds the FRP sheet laminate P5 having traveled on the main conveyance path 3 between the pair of rollers 4a, and draws the FRP sheet laminate P5 through rotation of the roller 4a by the drive source 4b to send it downstream.

As shown in FIG. 1, the first FRP sheet-forming section 5 is provided in a further upstream area than the main conveyance path 3. The first FRP sheet-forming section 5 includes a feeding device 6 that sends out an FRP raw sheet P1 from a state wound in a roll, a sub-conveyance path 7 that causes the FRP raw sheet P1 sent out from the feeding device 6 to travel, and a cutting device 8 that cuts the FRP raw sheet P1 having traveled on the sub-conveyance path 7 in a width direction thereof at a predetermined angle. In the FRP raw sheet P1 sent out from the feeding device 6, the orientation direction of the reinforcing fiber F thereof is 0° similar to the FRP raw sheet P1 unrolled by the unrolling device 2 onto the main conveyance path 3.

The feeding device 6 includes an unrolling device 6a that unrolls the FRP raw sheet P1 from a state wound in a roll, and a transfer device 6b that transfers the FRP raw sheet P1 unrolled by the unrolling device 6a onto the sub-conveyance path 7. The unrolling device 6a has a configuration similar to the unrolling device 2 described above and is configured to unroll the FRP raw sheet P1 in the length direction thereof from a state wound in a roll and to send it onto the sub-conveyance path 7.

The transfer device 6b is configured to be similar to the transfer device 4 described above and includes a pair of rollers 6c arranged in upper and lower and a drive source 6d such as a motor connected to either one of the pair of rollers 6c. The transfer device 6b holds the FRP raw sheet P1 unrolled by the unrolling device 6a between the pair of rollers 6c, and draws the FRP raw sheet P1 through rotation of the roller 6c by the drive source 6d to send it downstream of the sub-conveyance path 7.

The sub-conveyance path 7 is arranged on one side of the main conveyance path 3. The sub-conveyance path 7 extends so as to be orthogonal to the main conveyance path 3. The sub-conveyance path 7 is also a support table provided in a linear shape (straight plate shape) having a width greater than that of the FRP raw sheet P1 similar to the main conveyance path 3. The upper surface (supporting surface) of the sub-conveyance path 7 is formed into a smooth surface with a low frictional resistance such that the FRP raw sheet P1 can smoothly travel.

Figure 4:
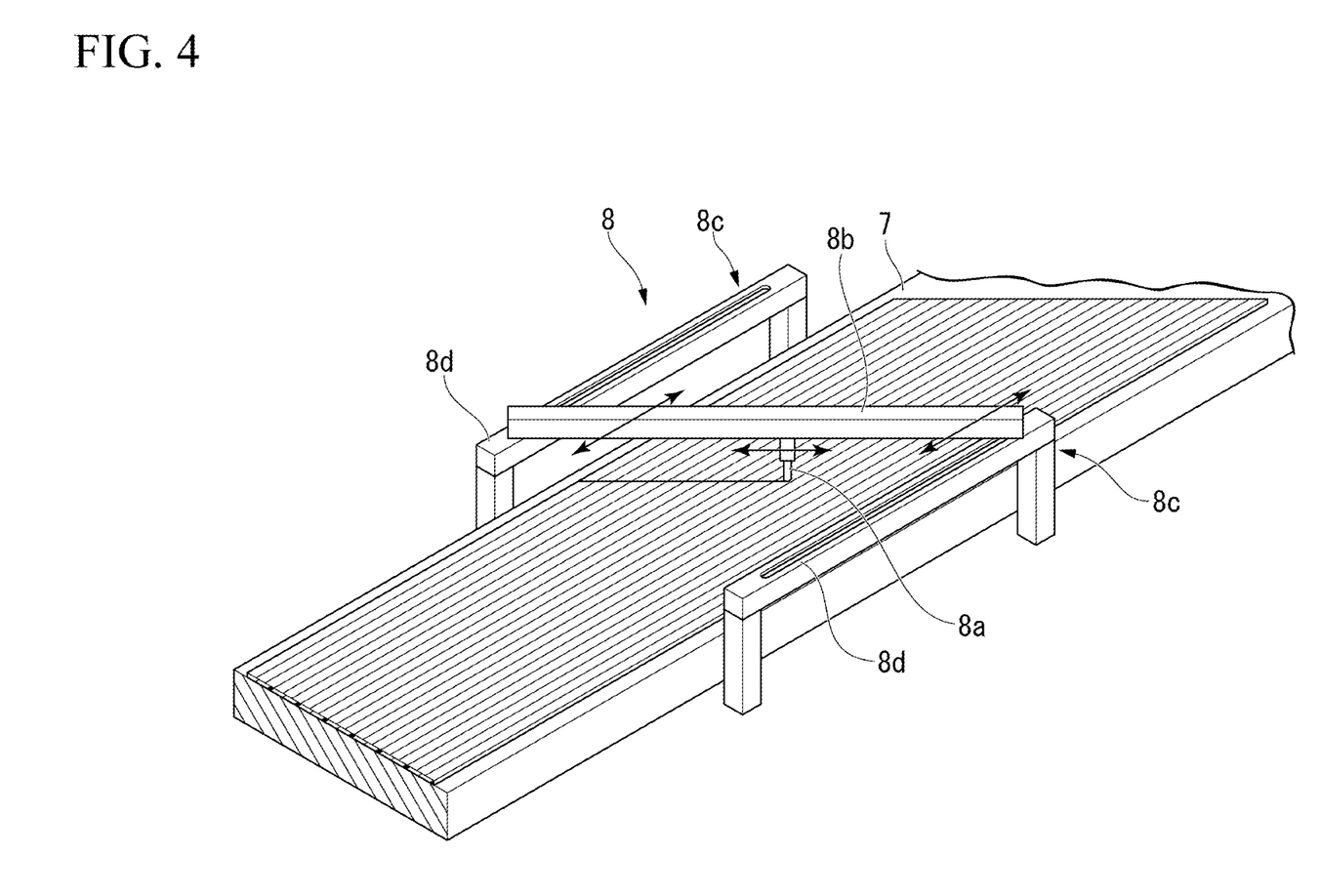
FIG. 4 is a perspective view schematically showing a cutting device of the present disclosure.

FIG. 4 is a perspective view schematically showing the cutting device 8 of the present disclosure.

As shown in FIG. 4, the cutting device 8 cuts the FRP raw sheet P1 having traveled on the sub-conveyance path 7 in a width direction thereof at a predetermined angle. The cutting device 8 includes a cutter 8a, a holding bar 8b that movably holds the cutter 8a, and a pair of support parts 8c that support both end portions of the holding bar 8b.

The cutter 8a is configured to reciprocate in the length direction of the holding bar 8b by a driving device such as a motor. The cutter 8a cuts the FRP raw sheet P1 by moving on the outward path and returns to the initial position by moving on the return path to stand by for a new cutting.

The holding bar 8b has, for example, an elongated square-pole shape formed to have a length sufficiently greater than the width of the FRP raw sheet P1. The holding bar 8b is configured to guide the cutter 8a in the length direction thereof. The holding bar 8b is arranged above the FRP raw sheet P1 so as to cross the FRP raw sheet P1 in the width direction thereof. The holding bar 8b is not limited to a square-pole shape.

The pair of support parts 8c movably support both end portions of the holding bar 8b so as to set the angle of the holding bar 8b with respect to the FRP raw sheet P1 to a predetermined angle. In the present disclosure, the support parts 8c support the holding bar 8b such that the holding bar 8b crosses the orientation direction of the FRP raw sheet P1, that is, the length direction of the FRP raw sheet P1, at 45° (−45°).

The cutter 8a moves in the length direction of the holding bar 8b, so that the cutter 8a cuts the FRP raw sheet P1 in the width direction thereof at an angle of 45° (−45°). Here, the symbol "−" of −45° denotes that the orientation direction of the reinforcing fiber F is shifted clockwise as shown in FIG. 3. Therefore, if the orientation direction is shifted counterclockwise, it is denoted by a symbol "+".

As shown in FIG. 4, the pair of support parts 8c are configured to change the angle of the holding bar 8b with respect to the FRP raw sheet P1 into an arbitrary angle. That is, the holding bar 8b is configured such that both ends of the holding bar 8b move in opposite directions parallel with the length direction of support bars 8d with respect to the support bars 8d directly supporting the holding bar 8b.

In this way, in the present disclosure, the angle with respect to the length direction of the FRP raw sheet P1 (the orientation direction of the reinforcing fiber F) is variable. Therefore, the cutting device 8 can also cut the FRP raw sheet P1 at, for example, "+30°" or "+60°" instead of performing the cutting of the FRP raw sheet P1 at "+45°". Furthermore, it is possible to cut at "−45°" or the like.

The cutting device 8 is controlled by a control device (not shown) such that the drive for the cutter 8a is linked to the operation of the transfer device 6b of the feeding device 6. That is, while the transfer operation for the FRP raw sheet P1 by the transfer device 6b is temporarily stopped, the cutter 8a is driven to cut the FRP raw sheet P1 at a predetermined angle, and the FRP sheet P2 having a parallelogram shape as shown in FIG. 3 is formed. The length of the side indicated by the reference sign L1 in FIG. 3 is equal to √2 times the width of the FRP raw sheet P1.

As shown in FIG. 1, a transfer device 9 that places the FRP sheet P2 on the FRP raw sheet P1 traveling on the main conveyance path 3 is provided on the downstream side of the cutting device 8. As shown in FIG. 2, the transfer device 9 includes a holding part 9a that suction-holds the FRP sheet P2, and a moving part 9b that rotates the holding part 9a in a horizontal plane to set the direction of the reinforcing fiber F of the FRP sheet P2 to a predetermined direction.

The holding part 9a is configured to detachably hold the FRP sheet P2 by suction to be described later. The moving part 9b is formed of robot arms, has a plurality of rotation axes and is configured to move the holding part 9a in horizontal X and Y directions, to rotate the holding part 9a around the axes and to lift and lower the holding part 9a.

With such a configuration, the transfer device 9 holds, by the holding part 9a, the FRP sheet P2 having a parallelogram shape cut by the cutting device 8, moves the held FRP sheet P2 onto the main conveyance path 3 by the moving part 9b, and thereafter detaches the FRP sheet P2 from the holding part 9a to place the FRP sheet P2 on the FRP raw sheet P1.

As shown in FIG. 3, the moving part 9b rotates the FRP sheet P2 and places it on the FRP raw sheet P1 such that the orientation direction of the reinforcing fiber F of the FRP sheet P2 is set to a predetermined direction, that is, the orientation direction is set to +45° that is an angle different from the orientation direction of the reinforcing fiber F of the FRP raw sheet P1. At the time the placement of the FRP sheet P2 is performed, the FRP sheet P2 is positioned such that cutting edges L2 of the FRP sheet P2 are disposed on the side edges of the FRP raw sheet P1.

As shown in FIGS. 1 and 2, the welding device 11 is provided in the main conveyance path 3. The welding device 11 heats a space between the front end and the rear end of the FRP sheets P2 placed on the FRP raw sheet P1 and the vicinity thereof. As the welding device 11, for example, an ultrasonic-welding machine can be used. The welding device 11 melts the resins of the FRP sheets P2 and the FRP raw sheet P1 below them to weld the FRP sheets P2 on front and rear on each other, and at the same time, to weld the FRP sheets P2 on the FRP raw sheet P1. As the welding device 11, it is possible to use a structure of rolling a heated roller or a structure of pressing an elongated heater wire thereon instead of the ultrasonic-welding machine.

A feeding device 12 is arranged in a further downstream area than the welding device 11. The feeding device 12 is disposed above the main conveyance path 3. The feeding device 12 is configured to send out another FRP raw sheet P3 onto a laminate of the FRP raw sheet P1 and the FRP sheet P2 traveling on the main conveyance path 3. As shown in FIG. 3, the FRP raw sheet P3 has an orientation direction of the reinforcing fiber F, which is 0°, similar to the FRP raw sheet P1.

As shown in FIG. 2, the feeding device 12 includes an unrolling device 12a that unrolls the FRP raw sheet P3 from a state wound in a roll, and a transfer device 12b that transfers the FRP raw sheet P3 unrolled by the unrolling device 12a onto the main conveyance path 3. The transfer device 12b is configured to transfer the FRP raw sheet P3, which has been unrolled by the unrolling device 12a and has been sent out upward temporarily, downward from above using a plurality of rollers 12c and to send out the FRP raw sheet P3 onto the above laminate travelling on the main conveyance path 3.

As shown in FIGS. 1 and 2, a welding device 13 is arranged in a further downstream area than the feeding device 12. The welding device 13 has a configuration similar to the welding device 11 and welds and unites the FRP raw sheet P3 being the uppermost layer and the laminate of the FRP raw sheet P1 and the FRP sheet P2 below it. In addition, for example, if a welding device 21 to be described later arranged in a further downstream area can weld all of the four sheets shown in FIG. 3 (the FRP raw sheet P1, the FRP sheet P2, the FRP raw sheet P3, and the FRP sheet P4), the welding device 13 may be omitted.

As shown in FIG. 1, the second FRP sheet-forming section 14 is arranged in a further downstream area than the welding device 13. The second FRP sheet-forming section 14 is configured to be substantially similar to the first FRP sheet-forming section 5 and includes a feeding device 15 that sends out an FRP raw sheet P1 from a state wound in a roll, a sub-conveyance path 16 that causes the FRP raw sheet P1 sent out from the feeding device 15 to travel, and a cutting device 17 that cuts the FRP raw sheet P1 having traveled on the sub-conveyance path 16 in a width direction thereof at a predetermined angle.

The feeding device 15 includes an unrolling device 15a that unrolls the FRP raw sheet P1 from a state wound in a roll, and a transfer device 15b that transfers the FRP raw sheet P1 unrolled by the unrolling device 15a onto the sub-conveyance path 16. The transfer device 15b includes a pair of rollers 15c arranged in upper and lower, and a drive source 15d such as a motor connected to either one roller 15c of the pair of rollers 15c to rotate the roller 15c.

The cutting device 17 cuts the FRP raw sheet P1 having traveled on the sub-conveyance path 16 in a width direction thereof at a predetermined angle, similar to the cutting device 8 of the first FRP sheet-forming section 5. However, the cutting device 17 is configured to cut the FRP raw sheet P1 in the width direction at an angle of −45° to form the FRP sheet P4 shown in FIG. 3. The length of the side indicated by the reference sign L3 in FIG. 3 is equal to √2 times the width of the FRP raw sheet P1.

The FRP sheet P4 is picked up by a transfer device 18. As shown in FIG. 2, the transfer device 18 includes a holding part 18a that suction-holds the FRP sheet P4, and a moving part 18b that rotates the holding part 18a in a horizontal plane to set the direction of the reinforcing fiber F of the FRP sheet P4 to a predetermined direction.

The transfer device 18 places the FRP sheet P4 on the FRP raw sheet P3 (the laminate) such that the direction of the reinforcing fiber of the FRP sheet P4 is an angle of −45° that is different from the direction (orientation) of the reinforcing fiber F of the FRP raw sheet P1, the FRP sheet P2 and the FRP raw sheet P3. At the time the placement of the FRP sheet P4 is performed, the FRP sheet P4 is positioned such that cutting edges L4 of the FRP sheet P4 are disposed on the side edges of the FRP raw sheet P1.

As shown in FIG. 1, the welding device 20 is provided slightly further downstream than the sub-conveyance path 16 in the main conveyance path 3. The welding device 20 has a configuration substantially similar to the welding device 11, welds the FRP sheets P4 together disposed in front and rear, and welds and unites these FRP sheets P4 and the laminate (the FRP raw sheet P3) below them.

Another welding device 21 is provided further downstream than the welding device 20. The welding device 21 welds the FRP sheet P4 being the uppermost layer and the laminate (the FRP raw sheet P3) below it again. At this time, the welding device 21 welds the FRP sheet P4 and the laminate in a direction intersecting with the cutting edge L4 of the FRP sheet P4 shown in FIG. 3. That is, the welding is performed at a different angle from that in the welding device 20, whereby an obtained laminate is more firmly united.

The FRP sheet laminate P5 formed in this way is cut into FRP sheet laminated products P6 having a rectangular shape shown in FIG. 1 by a cutting device 22 provided further downstream than the transfer device 4. The FRP sheet laminated products P6 are sequentially stored in a storage box 23 disposed further downstream than the main conveyance path 3 as shown in FIG. 2 and are supplied to a next process. For example, in the next process, the FRP sheet laminated product P6 is put into a roller press machine and is cut into an appropriate shape, and a plurality of obtained shaped products of the FRP sheet laminated products P6 are stacked to form a desired three-dimensional shape.

Next, the sheet space-detecting device 10 provided in the FRP sheet-laminating device 1 having the above configuration will be described with reference to FIGS. 5 to 11B. In the following description, the sheet space-detecting device 10 provided in the welding device 11 described above will be described, but the sheet space-detecting device 19 provided in the welding device 20 described above also has a configuration similar to the sheet space-detecting device 10.

Figure 5:
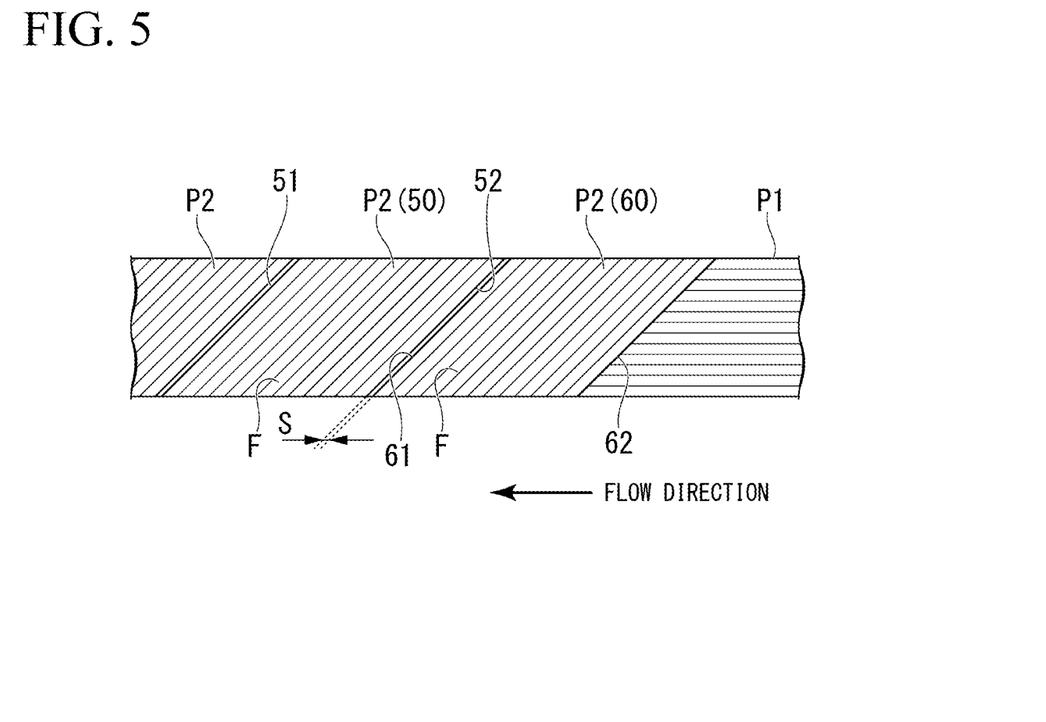
FIG. 5 is a plan view schematically showing the arrangement of FRP sheets of the present disclosure.

FIG. 5 is a plan view schematically showing the arrangement of the FRP sheets P2 of the present disclosure.

As shown in FIG. 5, the FRP sheets P2 are continuously arranged with almost no space therebetween in the front-rear direction on the FRP raw sheet P1. Of the FRP sheets P2, the front end 51 and the rear end 52 of a first FRP sheet 50 (a first fiber reinforced plastic sheet) preceding in the flow direction (hereinafter, referred to as the sheet flow direction) of the main conveyance path 3 are inclined at +45° with respect to the FRP raw sheet P1 (the length direction of the FRP raw sheet P1). In addition, the front end 61 and the rear end 62 of a second FRP sheet 60 (a second fiber reinforced plastic sheet) following the first FRP sheet 50 in the sheet flow direction are inclined at +45° with respect to the FRP raw sheet P1 (the length direction of the FRP raw sheet P1).

The first FRP sheet 50 and the second FRP sheet 60 are arranged with a space S between the rear end 52 of the first FRP sheet 50 and the front end 61 of the second FRP sheet 60. The space S has a size such that the rear end 52 of the first FRP sheet 50 does not overlap the front end 61 of the second FRP sheet 60. The space S extends at approximately +45° with respect to the FRP raw sheet P1. Moreover, the orientation direction (the length direction) of the reinforcing fiber F of the first FRP sheet 50 and the second FRP sheet 60 is substantially parallel to the space S (the extending direction of the space S).

Figure 6:
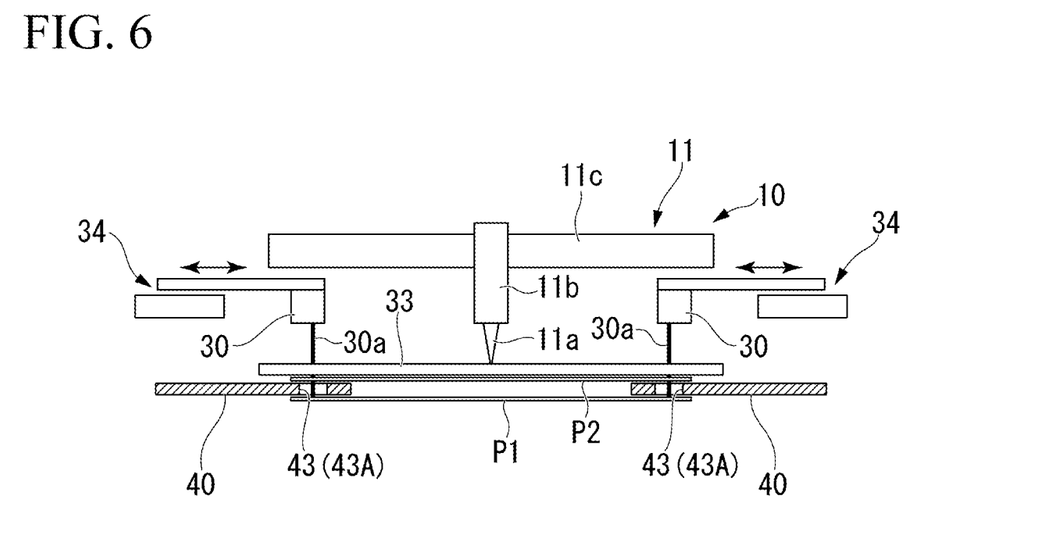
FIG. 6 is a front view of a sheet space-detecting device and a welding device of the present disclosure viewed in a sheet flow direction.
Figure 7:
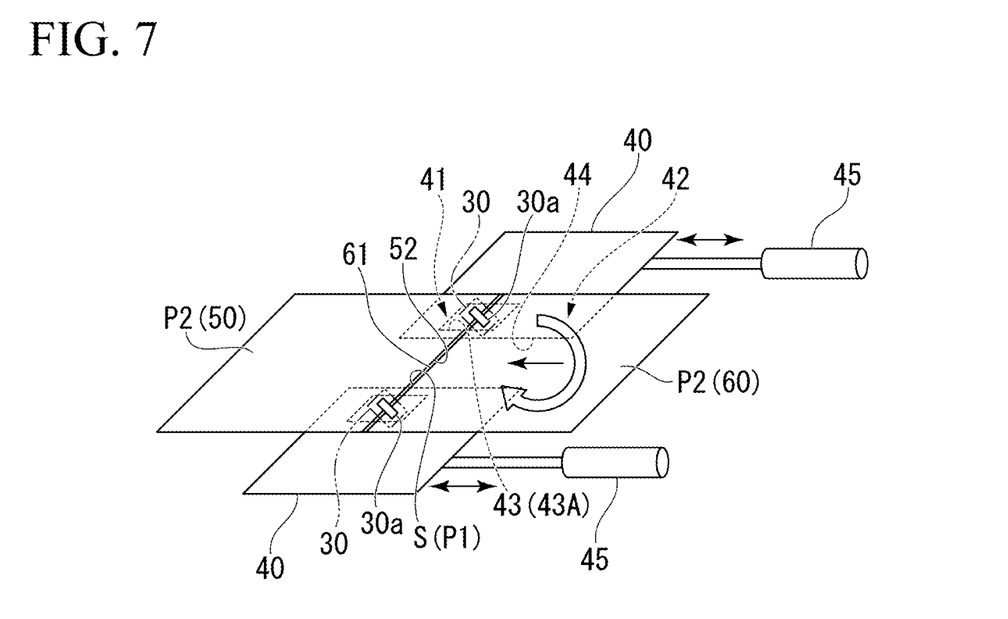
FIG. 7 is a plan view schematically showing the position of a light-detecting sensor and the shape of a spacer of the present disclosure.

FIG. 6 is a front view of the sheet space-detecting device 10 and the welding device 11 of the present disclosure viewed in the sheet flow direction. FIG. 7 is a plan view schematically showing the position of a light-detecting sensor 30 and the shape of a spacer 40 of the present disclosure.

Note that the plan view is a view viewed in a direction perpendicular to the plate surface of the FRP raw sheet P1 or the FRP sheet laminate P5.

As shown in FIG. 6, the welding device 11 includes a heater 11a that heats the space S and the vicinity thereof, a lifting mechanism 11b that lifts and lowers the heater 11a, and a moving mechanism 11c that moves the heater 11a and the lifting mechanism 11b along the space S.

The sheet space-detecting device 10 includes the optical light-detecting sensor 30 that detects the space S, and the spacer 40 interposed between the FRP raw sheet P1 and the FRP sheet P2. The light-detecting sensor 30 is supported by a slider mechanism 34. The slider mechanism 34 moves between a position right above the side end of the FRP raw sheet P1 and a position outside the FRP raw sheet P1 (outside in plan view) as shown by the arrows in FIG. 6. A pair of light-detecting sensors 30 are provided and project detection light 30a at both side ends of the space S as shown in FIG. 7.

The light-detecting sensor 30 projects the detection light 30a onto an area including the rear end 52 of the first FRP sheet 50, the front end 61 of the second FRP sheet 60, and the FRP raw sheet P1 (the reference surface) exposed from the space S and receives the reflected light thereof. The light-detecting sensor 30 detects a step (edge) of the sheet from, for example, a change in light amount of the reflected light and detects the space S based on the step of the sheet. As such a light-detecting sensor 30, for example, a two-dimensional laser displacement sensor can be appropriately adopted. Noted that the number of detection points for the step (edge) of the sheet is not only one but may also be two or more.

As shown in FIG. 7, a pair of spacers 40 are also provided corresponding to the light-detecting sensors 30. The spacer 40 is formed into a plate shape and is inserted under each of two side ends of the FRP sheet P2. In the following description, a direction perpendicular to the plate surface of the spacer 40 may be referred to as an up-down direction, a plate surface of the spacer 40 facing the FRP raw sheet P1 (the reference surface) may be described as a lower surface, and a plate surface of the spacer 40 facing (supporting) the FRP sheet P2 may be described as an upper surface. The thickness of the spacer 40 in the up-down direction is twice or more the thickness of the FRP sheet P2, or is 5 to 10 times or more. The spacer 40 includes a first support area 41 that supports the first FRP sheet 50, a second support area 42 that supports the second FRP sheet 60, and a step area 43 formed between the first support area 41 and the second support area 42. The step area 43 is an area separated downward from the first support area 41 and the second support area 42. That is, the step area 43 is a portion depressed from the upper surface of the spacer 40 toward the lower surface thereof.

The first support area 41 is an area further downstream (on the left side in FIG. 7) than the step area 43 in the sheet flow direction. The second support area 42 is an area further upstream (on the right side in FIG. 7) than the step area 43 in the sheet flow direction. The step area 43 is provided in an area between the first support area 41 and the second support area 42. The first support area 41 is smaller than the second support area 42 in the sheet flow direction. Further, the step area 43 is sufficiently larger than the space S in the sheet flow direction. That is, the rear end 52 of the first FRP sheet 50 and the front end 61 of the second FRP sheet 60 are disposed above the step area 43 with the space S.

The step area 43 does not extend to edges 44 of the spacer 40 parallel with the sheet flow direction.

In other words, the edges 44 are ends of the spacer 40 in the width direction of the FRP raw sheet P1, and the step area 43 is arranged apart from the edges 44.

The step area 43 of the present disclosure is a through-hole 43A that penetrates the spacer 40 in the up-down direction, and part of the first support area 41 and part of the second support area 42 are connected together.

Note that, as a modification of the step area 43, a step area may extend to either one of the edges 44 of the spacer 40 and may have a shape such as a notch. In addition, the step area 43 may extend to both side ends of the spacer 40, and the spacer 40 may have a shape divided (separated) into the first support area 41 and the second support area 42 by the step area 43.

The spacer 40 is connected to a moving device 45. The moving device 45 retracts the spacer 40 from the light-projected area of the detection light 30a. The moving device 45 includes a cylinder or the like that linearly moves, and retracts the spacer 40 toward upstream in the sheet flow direction. As shown by the arrow in FIG. 7, the spacer 40 moves by the moving device 45 between a position where the detection light 30a passes through the step area 43 and another position where the front end of the spacer 40 retracts further upstream than the detection light 30a (specifically, a position that the welding by the welding device 11 does not affect). Further, the spacer 40 may be connected to a moving device (not shown) that allows the spacer 40 to escape in a direction orthogonal to the sheet flow direction, for example, when the cutting angle for the FRP raw sheet P1 is switched between "+45°" and "−45°".

Figure 8:
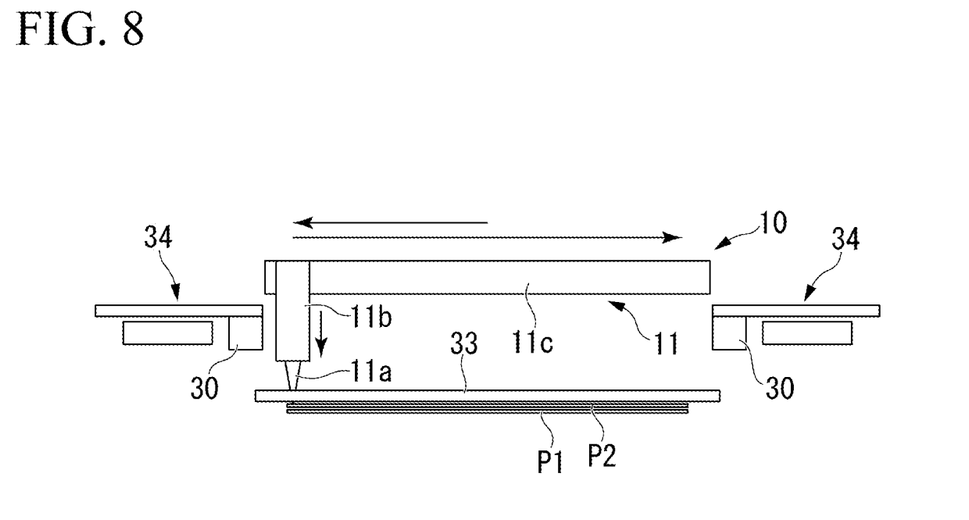
FIG. 8 is a front view of the sheet space-detecting device viewed in the sheet flow direction when the welding device of the present disclosure performs welding.

FIG. 8 is a front view of the sheet space-detecting device 10 viewed in the sheet flow direction when the welding device 11 of the present disclosure performs welding.

As shown in FIG. 8, at the time the welding device 11 performs welding, the light-detecting sensor 30 retracts outward of the FRP raw sheet P1, and the spacer 40 retracts upstream in the sheet flow direction. A reference sign 33 shown in FIG. 8 represents a holding part that holds down the FRP sheet P2 when the welding device 11 performs welding. The holding part 33 is formed into a rod shape that holds down a front end portion of the second FRP sheet 60 excluding the front end 61 thereof as shown in FIGS. 9A to 9C to be described later.

The holding part 33 holds down a front end portion other than the front end 61 of the second FRP sheet 60. The front end portion denotes a portion adjacent to the rear side of the front end 61.

The holding part 33 is provided with a guide 33a into which the second FRP sheet 60 is drawn. The guide 33a is a tapered surface provided at the lower end on the upstream side of the holding part 33 and inclines from the upper surface to the lower surface as it goes downstream. The holding part 33 is longer than the front end 61 of the second FRP sheet 60 and is arranged in inclining at a predetermined angle (+45°) with respect to the main conveyance path 3. The holding part 33 is connected to a drive unit (not shown) and is configured to be able to lift and lower. Note that the holding part 33 may have no drive unit, be positioned so as to be able to lift and lower, and be configured to press the front end portion of the second FRP sheet 60 by its own weight.

Figure 9A:
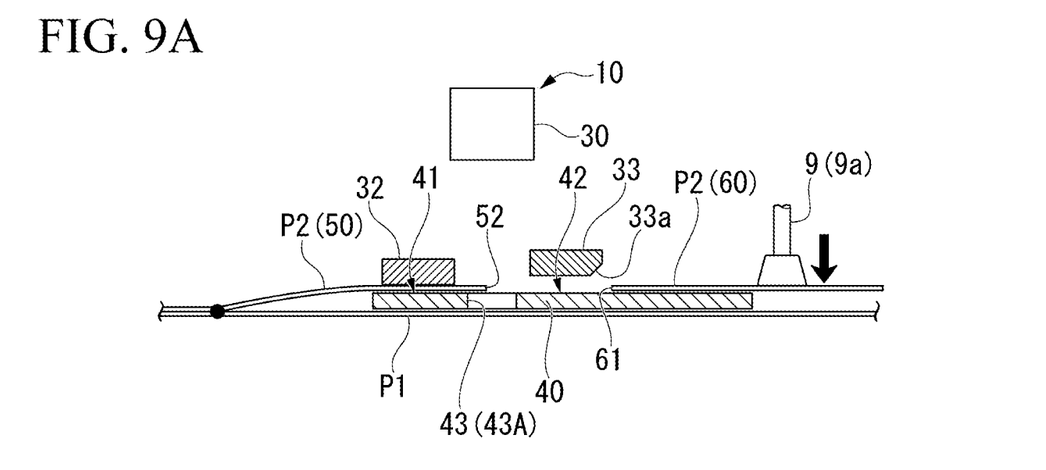
FIG. 9A is a side view schematically showing the operation of the sheet space-detecting device and the operation of the welding device of the present disclosure.
Figure 9B:
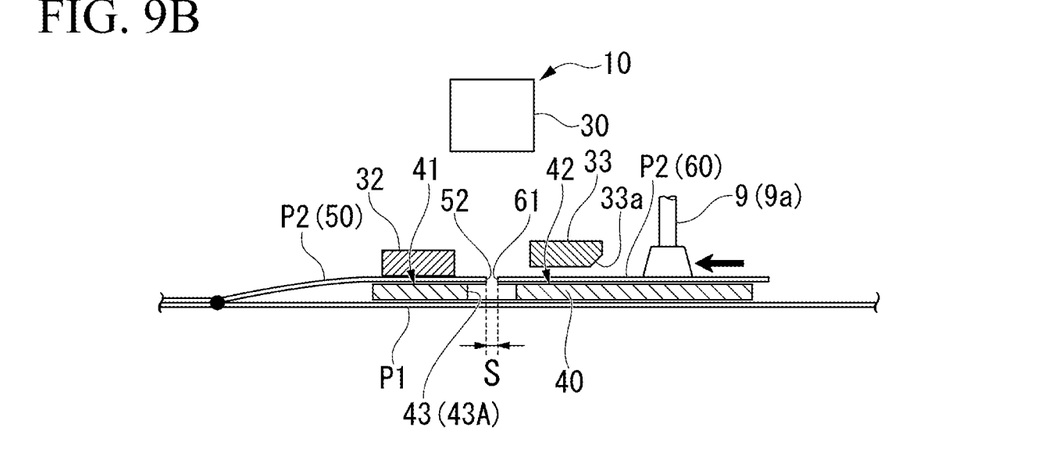
FIG. 9B is a side view schematically showing the operation of the sheet space-detecting device and the operation of the welding device of the present disclosure.
Figure 9C:
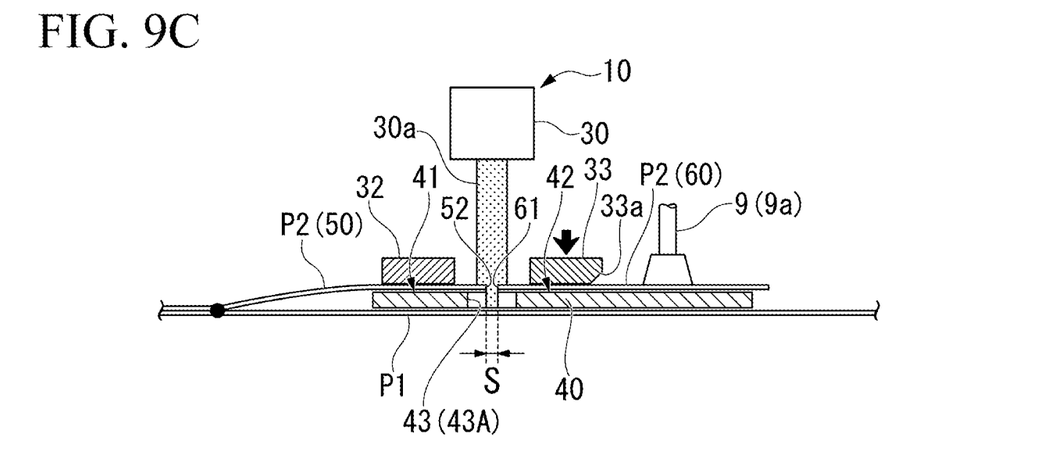
FIG. 9C is is a side view schematically showing the operation of the sheet space-detecting device and the operation of the welding device of the present disclosure.

A reference sign 32 shown in FIGS. 9A to 9C represents a holding part that holds down a rear end portion of the first FRP sheet 50 excluding the rear end 52 thereof.

The holding part 32 holds down a rear end portion other than the rear end 52 of the first FRP sheet 50. The rear end portion denotes a portion adjacent to the front side of the rear end 52.

The holding part 32 is also longer than the rear end 62 of the first FRP sheet 50 and is arranged to incline at a predetermined angle (+45°) with respect to the main conveyance path 3. The holding part 32 is connected to a drive unit (not shown) and is configured to be able to lift and lower. Note that the holding part 33 may also have no drive part, be positioned so as to be able to lift and lower, and be configured to press the rear end portion of the first FRP sheet 50 by its own weight.

Next, the operation of the sheet space-detecting device 10 (a sheet space-detecting method) and the operation of the welding device 11 (a sheet-welding method) configured as described above will be described with reference to FIGS. 9A to 11B. The operation of the sheet space-detecting device 10 and the operation of the welding device 11 are controlled by a control device (not shown).

The control device includes a CPU (Central Processing Unit), a memory such as a RAM (Random Access Memory) and a ROM (Read Only Memory), a storage device such as an SSD (Solid State Drive) and an HDD (Hard Disk Drive), and the like.

FIGS. 9A to 11B are side views schematically showing the operation of the sheet space-detecting device 10 and the operation of the welding device 11 of the present disclosure.

In this method, first, when the space S between the rear end 52 of the first FRP sheet 50 and the front end 61 of the following second FRP sheet 60 is detected, the spacer 40 is disposed (a spacer-disposing step). In the spacer-disposing step, first, as shown in FIG. 9A, the first FRP sheet 50 is supported by the first support area 41 of the spacer 40, and the rear end 52 of the first FRP sheet 50 is disposed above the step area 43 (a first step). Also, the front end 61 of the second FRP sheet 60 is supported by the second support area 42 of the spacer 40.

That is, in the spacer-disposing step, the spacer 40 is disposed such that the rear end 52 of the first FRP sheet 50 and the front end 61 of the second FRP sheet 60 are separated from the FRP raw sheet P1.

Next, as shown in FIG. 9B, the front end 61 of the second FRP sheet 60 is disposed above the step area 43 so as to be apart from the rear end 52 of the first FRP sheet 50 (a second step). Note that in the second step, it is appropriate that the front end 61 of the second FRP sheet 60 be disposed above the step area 43 with a space greater than the proper space S shown in FIG. 5 (for example, a space greater than the space S by about 10% to 50% thereof). Accordingly, the front end 61 of the second FRP sheet 60 is reliably prevented from overlapping the rear end 52 of the first FRP sheet 50. In the second step, since the transfer device 9 moves the second FRP sheet 60, the holding part 33 disposed on the upstream side may be lifted up. The holding part 32 disposed on the downstream side may be lowered. Further, in the second step, in order to adjust the entire space S, the transfer device 9 may move the second FRP sheet 60 not only in translation but also in rotation.

After the spacer-disposing step, in this method, as shown in FIG. 9C, the detection light 30a is projected on an area including the rear end 52 of the first FRP sheet 50, the front end 61 of the second FRP sheet 60, and the FRP raw sheet P1 (the reference surface) exposed from the space S, and the reflected light thereof is received (a light-detecting step). Here, in at least the light-projected area on which the detection light 30a is projected, the rear end 52 of the first FRP sheet 50 and the front end 61 of the second FRP sheet 60 are supported by the spacer 40 in a state where they are separated from the FRP raw sheet P1 (the reference surface).

In other words, in an area including at least the light-projected area on which the detection light 30a is projected, the rear end 52 of the first FRP sheet 50 and the front end 61 of the second FRP sheet 60 are supported by the spacer 40 in a state where they are separated from the FRP raw sheet P1 (the reference surface).

Note that in the light-detecting step, it is appropriate to lower the holding part 33 on the upstream side because the space S can be stably detected, but the holding part 33 disposed on the upstream side may be lifted up as long as the transfer device 9 holds the second FRP sheet 60.

The spacer 40 limits the rear end 52 of the first FRP sheet 50 and the front end 61 of the second FRP sheet 60 from coming into contact with the FRP raw sheet P1. Accordingly, the light-detecting sensor 30 can easily detect a step (edge) of the sheet, and as a result, the space S can be detected with high accuracy. In addition, as shown in FIG. 5, in a case where the orientation direction of the reinforcing fiber F of the first FRP sheet 50 and the second FRP sheet 60 is parallel to the space S, the rear end 52 and the front end 61 having low tensile strength or toughness are particularly easy to hang down, the reinforcing fiber F easily fluffs thereat, and therefore a great effect is obtained by disposing the spacer 40.

Figure 10A:
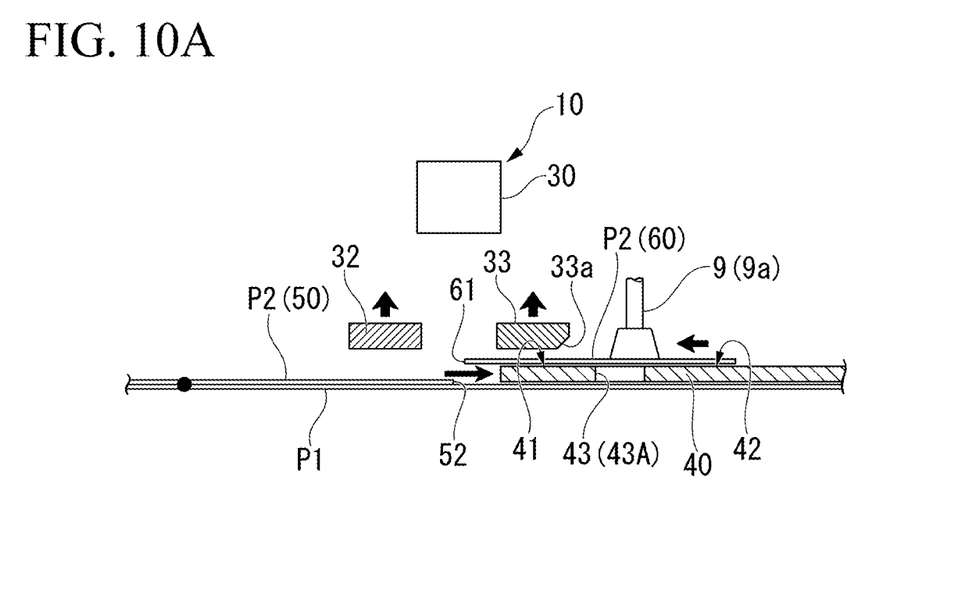
FIG. 10A is a side view schematically showing the operation of the sheet space-detecting device and the operation of the welding device of the present disclosure.

After the light-detecting step, in this method, as shown in FIG. 10A, the position of the second FRP sheet 60 with respect to the first FRP sheet 50 is corrected (a sheet position-correcting step). In the sheet position-correcting step, the space S detected by the light-detecting sensor 30 is compared with the space S having an appropriate size shown in FIG. 5, and according to a difference therebetween, the second FRP sheet 60 is moved by the transfer device 9. Note that it is appropriate to retract the spacer 40 from the light-projected area of the detection light 30a at the time after the light-detecting step and before the sheet position-correcting step or at the time after the sheet position-correcting step. When the spacer 40 is retracted, it is appropriate to lift up the holding part 32 holding down the rear end portion of the first FRP sheet 50 at the first support area 41. Further, in the light-detecting step shown in FIG. 9C, if the holding part 33 disposed on the upstream side is lowered, it is appropriate to lift up the holding part 33.

Figure 10B:
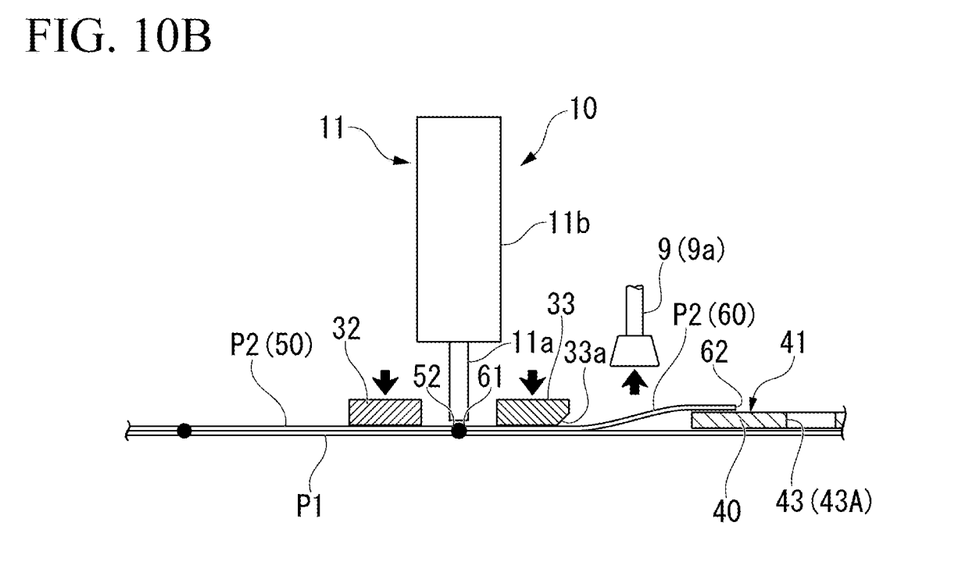
FIG. 10B is a side view schematically showing the operation of the sheet space-detecting device and the operation of the welding device of the present disclosure.

After the sheet-correcting step, in this method, as shown in FIG. 10B, the rear end portion of the first FRP sheet 50 excluding the rear end 52 is held down by the holding part 32, and the front end portion of the second FRP sheet 60 excluding the front end 61 is held down by the holding part 33 (a sheet-positioning step).

That is, the rear end portion other than the rear end 52 of the first FRP sheet 50 is held down by the holding part 32, and the front end portion other than the front end 61 of the second FRP sheet 60 is held down by the holding part 33.

In addition, after the front end portion of the second FRP sheet 60 is held down by the holding part 33, the transfer device 9 can release the suction to the second FRP sheet 60 and can move to pick up a next FRP sheet P2. After the sheet-positioning step, in this method, as described above, the rear end 52 of the first FRP sheet 50 and the front end 61 of the second FRP sheet 60 are welded by the welding device 11 (a sheet-welding step).

Figure 11A:
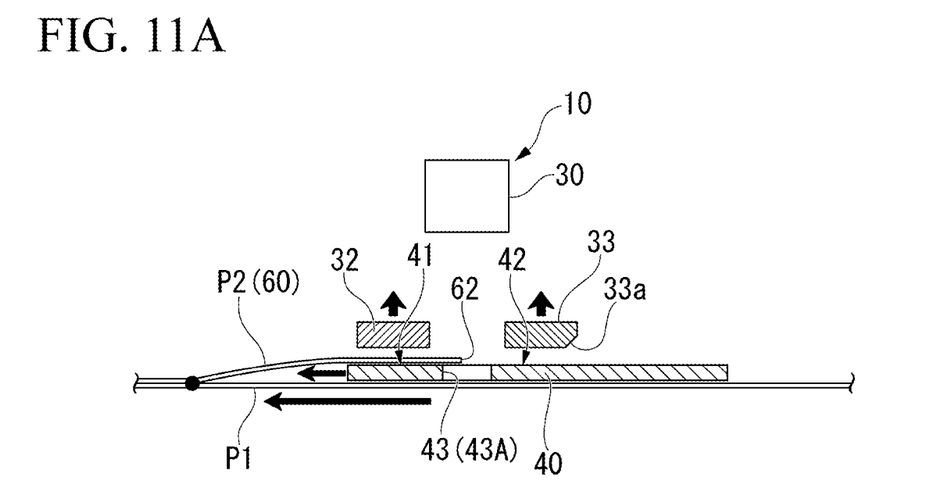
FIG. 11A is a side view schematically showing the operation of the sheet space-detecting device and the operation of the welding device of the present disclosure.

Next, in this method, as shown in FIG. 11A, in order to weld the rear end 62 of the welded second FRP sheet 60 with the next FRP sheet P2, the FRP raw sheet P1 is sent downstream in the sheet flow direction, and the step area 43 of the spacer 40 is moved to a position right below the light-detecting sensor 30. As shown in FIG. 10B of the previous step, at the time the spacer 40 is retracted upstream in the sheet flow direction, if a state is secured in which the rear end 62 of the second FRP sheet 60 is placed on the first support area 41 of the spacer 40, the spacer 40 does not have to be slid into a position under the second FRP sheet 60 when the spacer 40 is returned to the original position thereof, so that the movement of the spacer 40 can be smoothly performed. When the spacer 40 is returned to the original position, it is appropriate to lift up the holding parts 32 and 33 as shown in FIG. 11A.

Figure 11B:
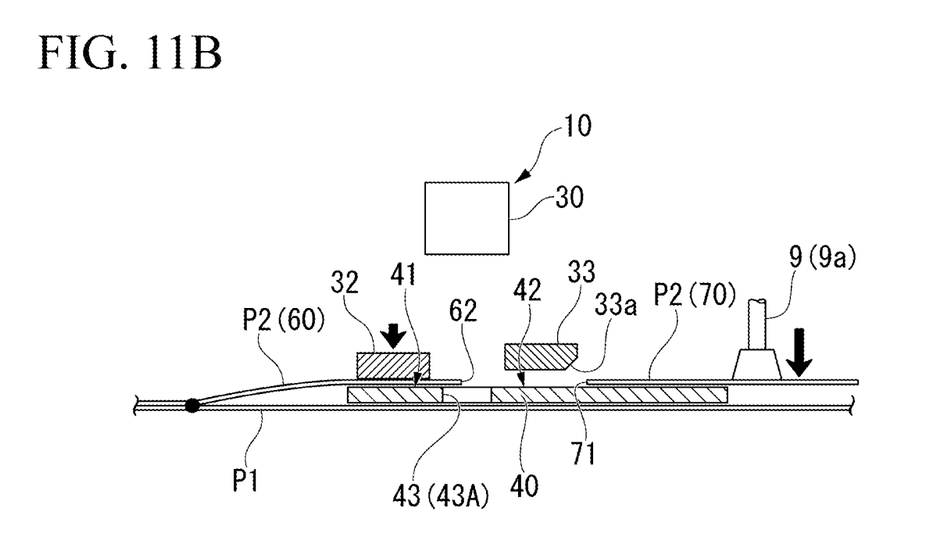
FIG. 11B is a side view schematically showing the operation of the sheet space-detecting device and the operation of the welding device of the present disclosure.

Next, in this method, as shown in FIG. 11B, the second FRP sheet 60 (which will be a first fiber reinforced plastic sheet) is supported by the first support area 41 of the spacer 40, the rear end 62 of the second FRP sheet 60 is disposed above the step area 43, and the holding part 32 is lowered to hold down the rear end portion of the second FRP sheet 60. Next, in this method, a next FRP sheet P2 (a third FRP sheet 70) is picked up by the transfer device 9. Then, the third FRP sheet 70 (which will be a second fiber reinforced plastic sheet) is supported by the second support area 42 of the spacer 40.

The subsequent operation is repetition of the flow from the step of FIG. 9A described above.

According to the present disclosure described above, when a configuration is adopted in which the sheet space-detecting device 10, which detects the space S between the rear end 52 of the preceding first FRP sheet 50 and the front end 61 of the following second FRP sheet 60 in the main conveyance path 3, includes: the light-detecting sensor 30 that projects the detection light 30a on an area including the rear end 52 of the first FRP sheet 50, the front end 61 of the second FRP sheet 60, and the FRP raw sheet P1 exposed from the space S and receives the reflected light thereof; and the spacer 40 that supports the rear end 52 of the first FRP sheet 50 and the front end 61 of the second FRP sheet 60 in a state where the rear end 52 and the front end 61 are separated from the FRP raw sheet P1 in at least the light-projected area on which the detection light is projected, it is possible to improve the detecting accuracy of the space S between front end and rear end of the FRP sheets P2.

Hereinbefore, an embodiment of the present disclosure is described with reference to the drawings, but the present disclosure is not limited to the above embodiment. The shapes, combinations and the like of the components shown in the above embodiment are examples, and various modifications can be made based on design requirements and the like within the scope of the present disclosure.

For example, for the spacer 40 described above, a configuration as shown in FIG. 12 can be adopted. In the following description, the same or equivalent components as or to those of the above embodiment are represented by the same reference signs, and the descriptions thereof are simplified or omitted.

Figure 12:
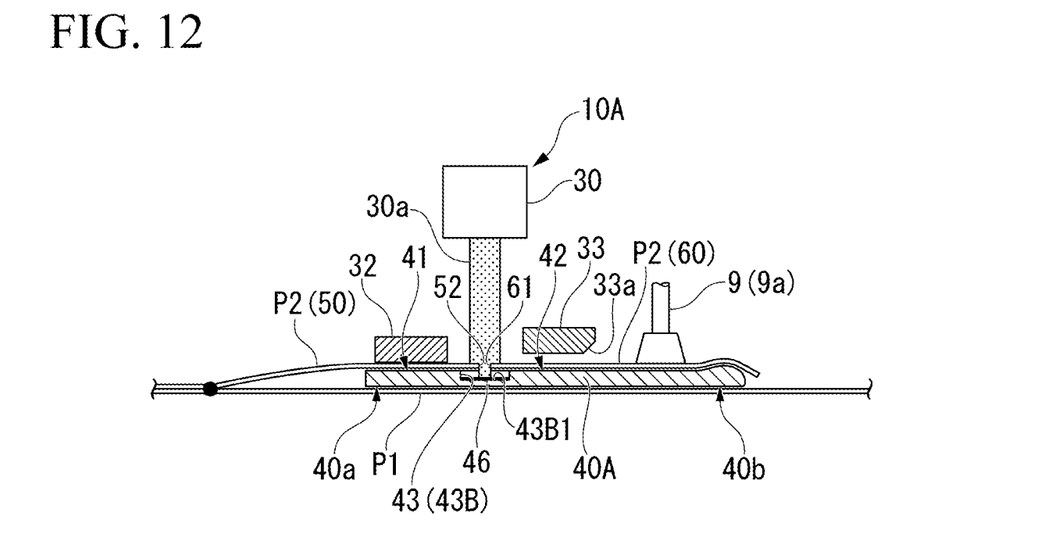
FIG. 12 is a side cross-sectional view schematically showing a spacer of a modification of the present disclosure.

FIG. 12 is a side cross-sectional view schematically showing a spacer 40A of a modification of the present disclosure.

As shown in FIG. 12, the spacer 40A is provided with a groove 43B as the step area 43. The groove 43B may extend to the edges 44 (refer to FIG. 7) of the spacer 40A. The groove 43B has a bottom portion 43B1. A direct reflection-limiting member 46 is arranged on the bottom portion 43B1. The direct reflection-limiting member 46 serves as the reference surface for detecting a step (edge) of the sheet instead of the FRP raw sheet P1 described above.

For the direct reflection-limiting member 46, a member having a reflection characteristic different from that of the FRP sheet P2 is appropriate, further a member more likely diffuse-reflecting the detection light 30a than the FRP sheet P2 is appropriate, and specifically, a sheet-shaped or tape-shaped member whose reflection surface is provided with a fine uneven form is appropriate. According to this configuration, since the reflection characteristic of the reference surface for detecting a step (edge) of the sheet is different from that of the FRP sheet P2, it is possible to more easily detect the step (edge) of the sheet than a case where the FRP raw sheet P1 whose material is the same as the FRP sheet P2 is used for the reference surface.

A rear end portion 40b of the spacer 40A is formed to more swell up than a front end portion 40a of the spacer 40A. The rear end portion 40b is thicker than the front end portion 40a and has a rounded shape swelling upward. According to such a configuration, it is possible to prevent the second FRP sheet P2 from tearing when the spacer 40A is retracted. That is, since the orientation directions of the reinforcing fibers of the second FRP sheet P2 are in one direction, if a portion thereof that rubs against the spacer 40A is sharp, the spacer 40A may enter between the reinforcing fibers and tear the second FRP sheet P2. If the second FRP sheet P2 is torn, a detecting error may occur when the space is detected at the torn portion, the device may stop, and therefore, the above configuration can eliminate such a concern.

In the above-described present disclosure, the orientation direction of the reinforcing fiber F of the FRP sheet P2 and the FRP sheet P4 is particularly set to +45° or −45°, but the orientation direction may be set to, for example, +30° (−30°), +60° (−60°) or the like by adjusting the angles of the holding bars of the cutting devices 8 and 17.

INDUSTRIAL APPLICABILITY

The present disclosure can be used for a sheet space-detecting device that detects a space between the rear end of a preceding first fiber reinforced plastic sheet and the front end of a following second fiber reinforced plastic sheet in a conveyance path for fiber reinforced plastic sheets.

The invention claimed is:

1. A sheet space-detecting device that detects a space between a rear end of a preceding first fiber reinforced plastic sheet and a front end of a following second fiber reinforced plastic sheet in a conveyance path for fiber reinforced plastic sheets, the sheet space-detecting device comprising:
    a light-detecting sensor that projects detection light on an area including the rear end of the first fiber reinforced plastic sheet, the front end of the second fiber reinforced plastic sheet, and a reference surface exposed from the space and receives reflected light thereof; and
    a spacer that supports the rear end of the first fiber reinforced plastic sheet and the front end of the second fiber reinforced plastic sheet in a state where the rear end and the front end are separated from the reference surface, in an area including at least a light-projected area on which the detection light is projected.

2. The sheet space-detecting device according to claim 1, wherein
    the spacer includes
        a first support area that supports the first fiber reinforced plastic sheet,
        a second support area that supports the second fiber reinforced plastic sheet, and
        a step area provided between the first support area and the second support area.

3. The sheet space-detecting device according to claim 2, wherein
    the step area does not extend to an edge of the spacer.

4. The sheet space-detecting device according to claim 3, wherein
    the step area is a groove having a bottom portion, and
    a direct reflection-limiting member forming the reference surface is disposed on the bottom portion.

5. The sheet space-detecting device according to claim 1, comprising
    a moving device that retracts the spacer from the light-projected area, wherein
    a rear end portion of the spacer is formed to more swell up than a front end portion of the spacer.

6. A sheet space-detecting method of detecting a space between a rear end of a preceding first fiber reinforced plastic sheet and a front end of a following second fiber reinforced plastic sheet in a conveyance path for fiber reinforced plastic sheets, the sheet space-detecting method comprising:
    a spacer-disposing step of disposing a spacer such that the rear end of the first fiber reinforced plastic sheet and the front end of the second fiber reinforced plastic sheet are separated from a reference surface; and
    a light-detecting step of, after the spacer-disposing step, projecting detection light on an area including the rear end of the first fiber reinforced plastic sheet, the front end of the second fiber reinforced plastic sheet, and the reference surface exposed from the space and receiving reflected light thereof.

7. The sheet space-detecting method according to claim 6, wherein
    an orientation direction of reinforcing fiber of the first fiber reinforced plastic sheet and the second fiber reinforced plastic sheet is parallel to the space.

8. The sheet space-detecting method according to claim 6, wherein
    the spacer includes
        a first support area that supports the first fiber reinforced plastic sheet,
        a second support area that supports the second fiber reinforced plastic sheet, and
        a step area provided between the first support area and the second support area, and
    the spacer-disposing step includes
        a first step of supporting the first fiber reinforced plastic sheet by the first support area, and disposing the rear end of the first fiber reinforced plastic sheet above the step area, and
        a second step of supporting the second fiber reinforced plastic sheet by the second support area, and disposing the front end of the second fiber reinforced plastic sheet above the step area such that the front end is separated from the rear end of the first fiber reinforced plastic sheet.

9. A sheet-welding method of detecting, based on the sheet space-detecting method according to claim 6, the space, and welding the rear end of the first fiber reinforced plastic sheet and the front end of the second fiber reinforced plastic sheet, the sheet-welding method comprising:
    a sheet position-correcting step of, after the light-detecting step, correcting a position of the second fiber reinforced plastic sheet with respect to the first fiber reinforced plastic sheet;
    a sheet-positioning step of, after the sheet position-correcting step, holding down a rear end portion other than the rear end of the first fiber reinforced plastic sheet, and holding down a front end portion other than the front end of the second fiber reinforced plastic sheet; and
    a sheet-welding step of, after the sheet-positioning step, welding the rear end of the first fiber reinforced plastic sheet and the front end of the second fiber reinforced plastic sheet.

* * * * *